United States Patent [19]

Kniley et al.

[11] Patent Number: 5,456,566
[45] Date of Patent: Oct. 10, 1995

[54] SYSTEM AND METHOD FOR TRANSPORTING GYMNASIUM FLOOR COVERING

[75] Inventors: John C. Kniley, Enfield, Conn.; Donald R. Walker, Winfield, Mo.

[73] Assignee: Southwest Recreational Industries, Inc., Leander, Tex.

[21] Appl. No.: 996,695

[22] Filed: Dec. 24, 1992

[51] Int. Cl.⁶ .................................................... B60P 1/00
[52] U.S. Cl. ........................ 414/546; 414/911; 280/79.6
[58] Field of Search ........................ 414/589, 546, 414/908, 910, 911, 917; 280/47.35, 79.6, 47.34, 47.41; 254/10 R; 248/129; 242/58.6, 86.52

[56] References Cited

U.S. PATENT DOCUMENTS

| | | | |
|---|---|---|---|
| 2,543,507 | 2/1951 | Rancourt | 242/68 |
| 3,325,120 | 6/1967 | Brinkman | 242/86.52 |
| 3,481,556 | 12/1969 | McDonnell | 242/86.52 |
| 3,501,109 | 3/1970 | Edson | 242/86.52 |
| 3,631,999 | 1/1972 | Walerowski | 214/390 |
| 3,638,815 | 2/1972 | Fincher | 214/390 |
| 3,782,663 | 1/1974 | Stevenson | 242/55 |
| 3,902,612 | 9/1975 | Hall | 414/546 X |
| 3,944,094 | 3/1976 | Compton | 214/390 |
| 4,084,763 | 4/1978 | Zamboni | 242/86.52 |
| 4,266,903 | 5/1981 | Surbrook | 414/428 |
| 4,295,777 | 10/1981 | Bell et al. | 414/458 |
| 4,447,012 | 5/1984 | Woodruff | 242/54 R |
| 4,593,883 | 6/1986 | Nelson | 254/7 B |
| 4,705,283 | 11/1987 | Kleisath | 414/910 X |
| 4,711,407 | 12/1987 | Boon | 242/86.52 |
| 4,824,313 | 4/1989 | Miller | 414/346 |
| 4,930,958 | 6/1990 | Palmer | 412/24.5 |
| 5,052,877 | 10/1991 | Jääskeläinen et al. | 414/458 |

FOREIGN PATENT DOCUMENTS

| | | |
|---|---|---|
| 2524480A1 | 12/1976 | Germany . |
| 1454927 | 3/1974 | Japan . |

*Primary Examiner*—Donald W. Underwood
*Attorney, Agent, or Firm*—Needle & Rosenberg

[57] ABSTRACT

A system for transporting, storing and installing flexible gymnasium floor covering is provided. The system includes a spindle for supporting a roll of floor covering, and a transporting device having a longitudinal frame, casters attached to the frame, lifting arms for lifting the spindle, linear actuators for raising and lowering the lifting arms, means for powering and controlling the linear actuators and means for storing unused spindles. A method for transporting flexible floor covering is also provided and includes the steps of placing a spindle along an unrolled piece of floor covering and rolling the floor covering up around the spindle, moving a transporting device into position so that the bearing surfaces of the lifting arm are aligned with the arms of the spindle, lifting the spindle, moving the transporting device to the desired location and lowering the spindle.

5 Claims, 3 Drawing Sheets

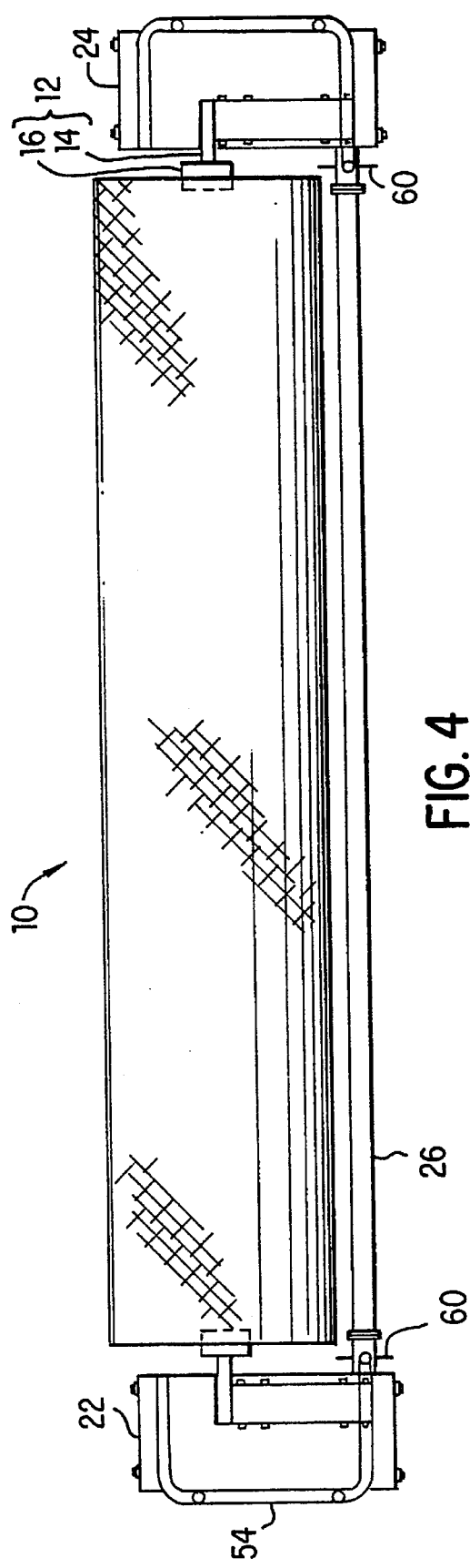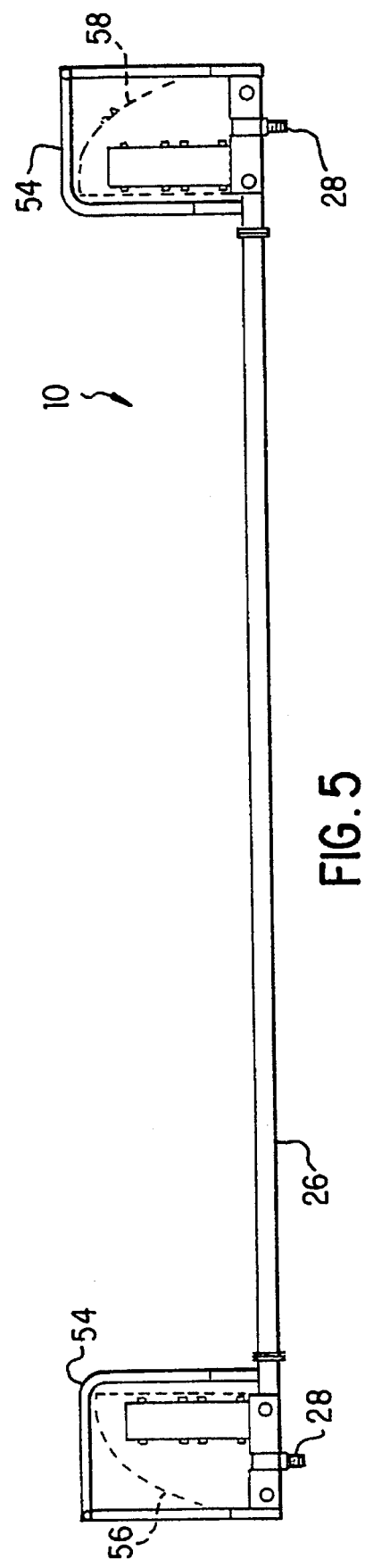
FIG. 4
FIG. 5

SYSTEM AND METHOD FOR TRANSPORTING GYMNASIUM FLOOR COVERING

BACKGROUND OF THE INVENTION

Devices for lifting rolls of material are well known in the art. The disclosed devices include, for example, lifting arms powered by various means and disposed on wheeled frames (U.S. Pat. Nos. 4,266,903; 4,084,763; 4,593,883; 4,447,012; and UK Patent No. 1,454,927). The devices disclosed in the prior art have several disadvantages. Some of these devices are large and unsuitable for use indoors, or are complicated to use and maintain because of the large number of moving parts required for their operation. Particularly, none of these devices are suitable for use in an indoor environment where such devices are required to be moved through doorways from one location to another and, where they are to be installed, transported and operated by as few as two individuals.

Currently, there exists no portable turf system for use in doors over a gym floor. Pro-gym (Collins and Aikman, Dalton, Ga.) is a heavy duty gymnasium floor covering that is permanently installed. Other gymnasium floor coverings, such as Magic Carpet (Balsam-Astroturf, St. Louis, Mo.) and indoor convertible fields are expensive and difficult to transport, store and install.

Therefore, there exists a need for an economical system and apparatus capable of transporting rolls of flexible gymnasium floor covering within an enclosed indoor space.

SUMMARY OF THE INVENTION

The present invention meets the above needs by providing an apparatus and system for installing gymnasium floor covering that has a simple 3-sided wheeled frame, electrically operated linear actuators for lifting and lowering arms on which a roll of gymnasium floor covering rests.

The present invention provides a system for transporting, storing and installing flexible gymnasium floor covering. The system includes a spindle for supporting a roll of floor covering and a transporting device. The transporting device includes the following elements: 1) a longitudinal frame having two lateral sides and a third elongated side interconnecting the lateral sides; 2) casters attached to the frame for wheeling the frame; and 3) a lifting arm attached to each lateral side, each lifting arm being capable of receiving an end portion of the spindle. Linear actuators mounted on each lateral side of the frame are connected to respective lifting arms for moving the lifting arms up and down. The linear actuators can be powered by an electric battery, which is controlled by electrical switches operated by the user of the system. Using this system, as few as two people can transport and install rolls of gymnasium floor covering and remove the floor covering from the gymnasium when it is not in use.

BRIEF DESCRIPTION OF THE FIGURES

FIG. 3b is a view of the opposite end of the transporting device from the view in FIG. 3a.

FIG. 4 shows the top plan view of the lifting device with the cover removed to illustrate the position of lifting arms and actuators.

FIG. 5 is a side plan view of the transporting device with portions of the cover cut away to illustrate the lifting arms.

DETAILED DESCRIPTION OF THE INVENTION

Figure 2:
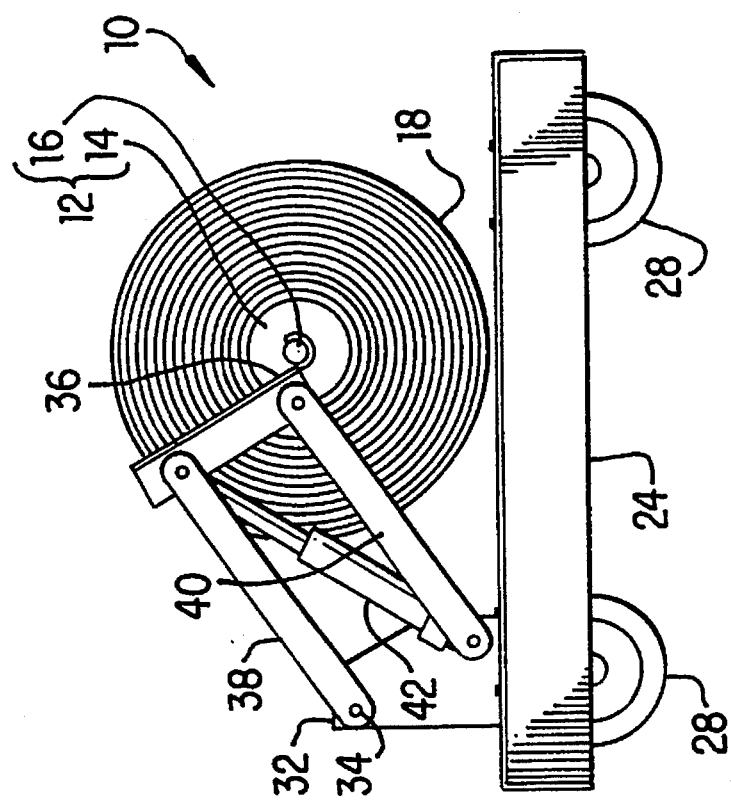
FIG. 2 is the same view as FIG. 1 except with the arm in the up position.

The present system 10 (FIGS. 1–6) for transporting and installing flexible gymnasium floor covering comprises a spindle 12 having a central portion 14 and two end portions 16 for supporting a roll of floor covering 18 generally axially through the roll. The system also includes a transporting device, which includes a longitudinal frame 20 having two lateral sides 22, 24 and a third elongated longitudinal side 26 interconnecting the lateral sides. Casters 28 are attached to the frame 20 for wheeling frame 20 into position.

Figure 1:
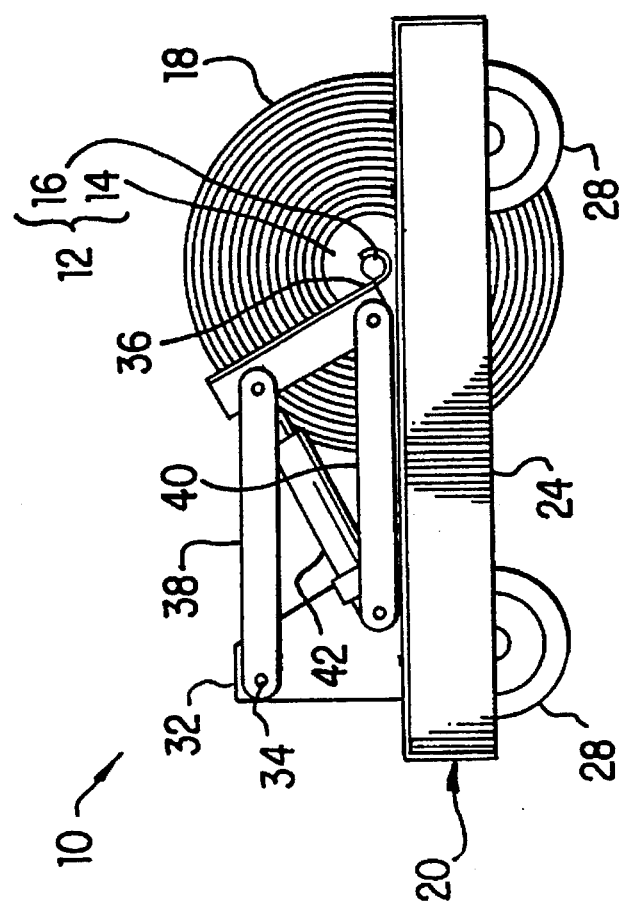
FIG. 1 is an end view of the transporting device with its cover removed to show the arm in the down position.

A lifting arm assembly is attached to each lateral side 22, 24. Each lifting arm assembly includes a lifting arm bracket 32, a lifting arm and a bearing surface 36 for receiving an end portion 16 of the spindle 12. As shown in FIGS. 1 and 2, the lifting arm comprises two parallel members 38, 40 each of which is rotatably connected at one end to lifting arm bracket 32, and rotatably connected at the other end to bearing surface 36. The means for rotatably connecting the lifting arm to bearing surface 36 and lifting arm bracket 32 can be pin 34, bolt or other rotatable fastener. Alternatively, the lifting arm can comprise a single element connected to a bearing surface and actuated by a linear actuator.

A linear actuator 42 is mounted on each lateral side 22, 24 of the frame 20 and is rotatably connected at one end to bearing surface 36, and has the same rotation as the end of parallel member 38 that is rotatably connected to bearing surface 36. The other end of linear actuator 42 is rotatably connected to lifting arm bracket 32, and has the same axis of rotation as the end of parallel member 40 that is rotatably connected to lifting arm bracket 32. As can be seen in FIGS. 1 and 2 this configuration permits the angle of the bearing surface to remain the same, regardless of whether the lifting arm is in the raised or lowered position. The linear actuator 42 can be any standard linear actuator known in the art, such as an electric motor operated ball screw device.

The linear actuators are powered by means of a battery. The system may also include a battery charger to allow the battery to be recharged using standard electrical outlets as a source of power while the transporting device is not being used.

Means for controlling the supply of power to linear actuators 42 include standard electrical switches. The controlling means can include an electrical circuit having a first switch 48 and a second switch 50 wherein the activation of one of the switches inactivates the other switch. This prevents users of the system from powering the lifting arms simultaneously from both ends of the transporting device. Further, the controlling means for the power source can include a key lock 52, the position of the key in the lock determining whether the electrical circuit 46 is opened or closed. Thus, when the key is in the off position, the circuit is open and the actuators will not move.

The transporting device includes a railing 54 extending from frame 20 for maneuvering the transporting device by hand. Railing 54, as shown in FIGS. 3, 4 and 5, can be constructed of materials having the strength and durability characteristics generally considered suitable for such railings. The railing 54 on each end of the transporting device also includes a rack 60 for holding the ends 16 of spindle 12, so that the spindles 12 can be carried on the transporting device when they are not in use. In most gymnasium applications, rack 60 will typically include spaces for storing four spindles.

Figure 3A:
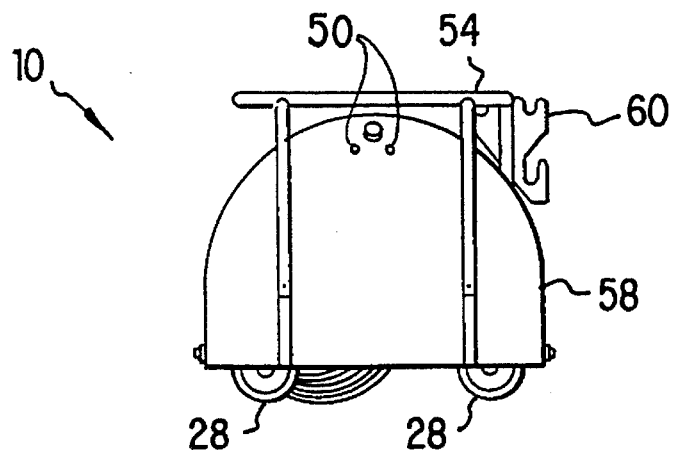
FIG. 3a is an end view of the transporting device with the arm in the down position, with the cover and end railing in place.
Figure 3B:
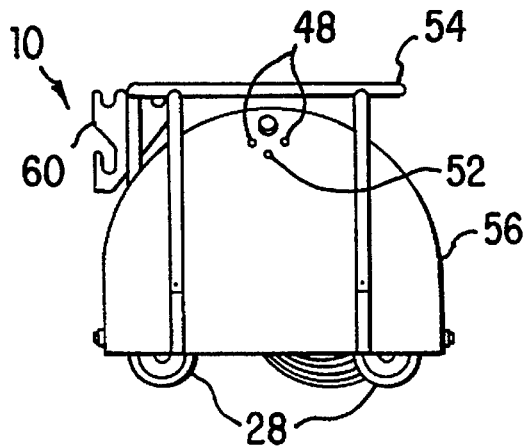
Figure 6:
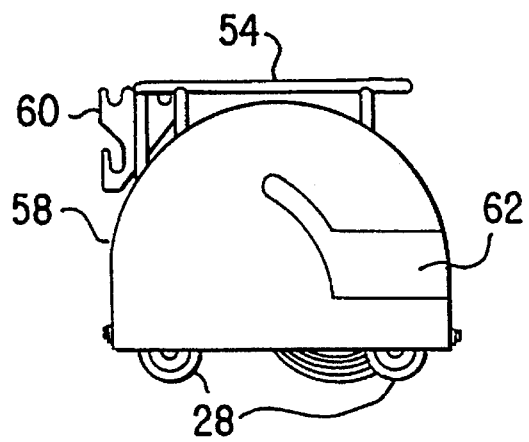
FIG. 6 is a view of the inside surface of a cover member showing an aperture.

The present system 10 also includes cover members 56, 58 for covering linear actuators 42, battery and lifting arm assemblies. Cover members 56, 58 have an aperture 62 through which ends 16 of spindle 12 can be fit so that bearing surface 36 of the lifting arm can contact ends 16 of spindle 12 for lifting and lowering the roll of floor covering 18. As shown in FIGS. 3a and 3b, when the system includes cover members 56, 58, the means for controlling linear actuators 42, such as switches 48 and 50 and lock 52, are on cover members 56, 58 in positions accessible to the user.

System 10 can also include a stand for holding a spindle 12 supporting a roll of floor covering 18 for storage of the floor covering while it is not in use.

System 10 further includes means for maintaining an installed, unrolled roll of flexible floor covering in an abutted relationship to an adjacent roll of installed, unrolled floor covering. The means may comprise hook and pile material, wherein a strip of either hook or pile material is attached to a surface, preferably the bottom surface, of a piece of unrolled floor covering. The strip of hook or pile material is positioned on the floor covering so that it aligns with similar material on an adjacent piece of floor covering. A strip of pile or hook is then positioned to overlap the respective hook or pile material on the two adjacent pieces of floor covering. In this manner, the pieces of floor covering can be maintained in abutted relationship and slippage avoided.

The flexible gymnasium floor covering can be made of any material that can be rolled about spindle 12. For example, a preferred turf-type floor covering of the present invention comprises a top layer (approximately 40 oz.) of nylon 6-6 pile knitted to polyester tire cord (Firestone, Hopewell, Va.) with a layer (approximately 3 oz.) of polyurethane foam forming a pad on the bottom. The advantage of this artificial turf gymnasium floor covering is that the polyurethane layer is only 3–5 mm thick, compared to other artificial turf pads that are approximately 16 mm thick. This floor covering is well suited for use in the present system because it is more easily rolled, weighs less and takes up less storage space when not installed, than other gymnasium floor coverings Furthermore, the dimensions of the pieces of the floor covering are limited only by the maximum width of the central portion 14 of spindle 12. In this regard, it is clear that the dimensions of spindle 12 and the transporting device can be varied, according to the uses to which the present system will be put. A preferred embodiment of the transporting device such as that shown in the Figures is approximately 44 inches wide, by 36 inches tall, by 17 feet long.

A method for transporting flexible floor covering is also provided. When it is desired to remove the gymnasium floor covering from the gymnasium floor and transport it for storage, the steps of the present method include placing a spindle along one edge of an unrolled piece of floor covering laying on a floor surface, and rolling the floor covering up around the spindle such that the ends of the spindle extend beyond the width of the floor covering. A transporting means, including two lifting arms, is then moved into a position adjacent to the spindle when the piece of floor covering is completely rolled up around the spindle. The lifting arms are adjusted so that the spindle bearing surface of each lifting arm is aligned with each end of the spindle. The spindle and the supported rolled floor covering can then be lifted off the floor surface and the transporting device moved to the desired location, where the spindle and the rolled floor covering can be lowered onto the floor or a stand.

Each of the above operations, except for the powering of the linear actuators, is accomplished by hand. For example, the step of placing the spindle on the unrolled floor covering is accomplished by manually aligning the spindle along the edge of the unrolled floor covering that is to be rolled up first. The steps of moving the transporting means into position so that the spindle bearing surface on the lifting arm aligns with the end of the spindle are accomplished by manually wheeling the transporting means to the appropriate position.

The steps of lifting and lowering the spindle with the rolled floor covering are accomplished by powering linear actuators to actuate the lifting arms which bear the ends of the spindle, either up or down, respectively.

While the invention has been described in detail with particular reference to the preferred embodiment thereof, it will be understood that variations and modifications can be effected within the spirit and scope of the invention as previously described and as defined by the claims.

What is claimed is:

1. A system for transporting, storing and installing flexible gymnasium floor covering, comprising:

a. a spindle having a central portion and two end portions for supporting a roll of floor covering generally axially through said roll;

b. a transporting device comprising:

i. a longitudinal frame, having two lateral sides and a third elongated longitudinal side interconnecting the lateral sides;

ii. casters attached to said frame for wheeling the frame into position;

iii. a lifting arm attached to each lateral side, each lifting arm having a bearing surface for receiving an end portion of said spindle thereon;

iv. linear actuators mounted on each lateral side of said frame each connected to one end of said lifting arm for actuating said lifting arms;

v. means for powering said linear actuators; and vi. means for controlling said powering means; and c. cover members for covering said linear actuators, powering means and lifting arms, each said cover member having an aperture comprising an arcuate section therein through which the ends of said spindle can be fitted so that said bearing surfaces can contact the ends of said spindle for lifting and lowering said roll of floor covering.

2. The system of claim 1, wherein said transporting device further comprises a railing extending from each of said lateral sides of said frame for maneuvering said device by hand.

3. The system of claim 1, wherein said means for controlling said powering means comprises a switch located on one of said cover members in a position that is accessible to the user.

4. The system of claim 3, wherein the means for controlling said powering means further comprises an electrical circuit having a first switch and a second switch, wherein the activation of one of said switches inactivates the other switch.

5. The system of claim 4, wherein the means for controlling said powering means further comprises a lock operable by key, the position of the key in said lock determining whether the electrical circuit is open or closed.

* * * * *